United States Patent
Hoskins et al.

(10) Patent No.: US 9,620,309 B2
(45) Date of Patent: Apr. 11, 2017

(54) ROTARY SELECTOR SWITCH AND RELATED SYSTEMS AND METHODS

(71) Applicant: Kostal of America, Troy, MI (US)

(72) Inventors: Steven R. Hoskins, Walled Lake, MI (US); Michael F. Tefend, Lake Orion, MI (US)

(73) Assignee: Kostal of America, Troy, MI (US)

( * ) Notice: Subject to any disclaimer, the term of this patent is extended or adjusted under 35 U.S.C. 154(b) by 178 days.

(21) Appl. No.: 14/377,653

(22) PCT Filed: Feb. 15, 2013

(86) PCT No.: PCT/US2013/026409
§ 371 (c)(1),
(2) Date: Aug. 8, 2014

(87) PCT Pub. No.: WO2013/123375
PCT Pub. Date: Aug. 22, 2013

(65) Prior Publication Data
US 2015/0027861 A1    Jan. 29, 2015

Related U.S. Application Data (60) Provisional application No. 61/599,466, filed on Feb. 16, 2012.

(51) Int. Cl.
*H01H 9/28* (2006.01)
*H01H 19/16* (2006.01)
(Continued)

(52) U.S. Cl.
CPC ............ *H01H 19/16* (2013.01); *F16H 59/08* (2013.01); *F16H 61/22* (2013.01); *G05G 5/04* (2013.01);
(Continued)

(58) Field of Classification Search
CPC .. H01H 3/00; H01H 3/02; H01H 3/08; H01H 3/10; H01H 3/32; H01H 3/42; H01H 3/46;
(Continued)

(56) References Cited

U.S. PATENT DOCUMENTS 4,983,790 A  *  1/1991  Bogda ................. H01H 43/106
                                            200/38 A
6,196,078 B1     3/2001  DeJonge et al.
(Continued)

FOREIGN PATENT DOCUMENTS

DE      102006007600 A1    8/2007
WO      WO-2006021198 A1   3/2006
WO      WO-2006074645 A1   7/2006

OTHER PUBLICATIONS

International Search Report dated Sep. 12, 2013; 5 pages.

*Primary Examiner* — Anthony R. Jimenez
(74) *Attorney, Agent, or Firm* — Butzel Long, P.C.; Bill C. Panagos (57) ABSTRACT

A rotary selector switch prevents accidental rotation to an undesired position. For example, an automobile moving forward at 55 kph may have a rotary selector switch in electrical communication with its transmission. The disclosed switch prevents accidental rotation that would indicate that a REVERSE gear is desired when it is not. Optionally, on override feature may permit users to overpower an otherwise prevented rotation.

10 Claims, 6 Drawing Sheets

(51) Int. Cl.
    *F16H 61/22*     (2006.01)
    *G05G 5/04*     (2006.01)
    *F16H 59/08*     (2006.01)
    *F16H 61/18*     (2006.01)

(52) U.S. Cl.
    CPC ........ *F16H 61/18* (2013.01); *F16H 2059/081* (2013.01); *H01H 2231/026* (2013.01); *H01H 2300/02* (2013.01)

(58) Field of Classification Search
    CPC .. H01H 3/50; H01H 3/54; H01H 3/58; H01H 9/20; H01H 9/22; H01H 9/28; H01H 2003/00; H01H 9/02; H01H 9/0273; H01H 9/028; H01H 9/08; H01H 9/10; H01H 9/105; H01H 2009/00; H01H 2009/20; H01H 2009/28; H01H 2221/01; H01H 2221/012; H01H 2221/024; H01H 2221/03; H01H 2221/06; H01H 2221/088; H01H 2231/026; H01H 2239/03; H01H 2239/05; H01H 2300/02; H01H 19/16; F16H 59/08; F16H 61/18; F16H 61/22; G05G 5/04; B60K 31/042
    USPC ... 200/43.11, 11 R, 5 E, 13, 14, 11 C, 19.07, 200/19.08, 19.18, 296, 336, 303, 11 DA, 200/11 G, 11 TW, 19.01, 19.06, 19.19, 200/557, 43.13; 74/473.1, 473.12, 473.3, 74/10 R, 10.15, 2, 10.27, 10.29, 10.22, 74/10.6, 813 R, 816, 567
    See application file for complete search history.

(56) References Cited

U.S. PATENT DOCUMENTS 7,514,643 B1 *   4/2009   Tittle ................... H01H 13/023
                                                                        200/314
2008/0197004 A1   8/2008   Ishigaki et al.

* cited by examiner

ROTARY SELECTOR SWITCH AND RELATED SYSTEMS AND METHODS

CROSS-REFERENCE TO RELATED APPLICATIONS

This National Phase Application claims priority to U.S. provisional patent application No. 61/599,466, filed Feb. 16, 2012, and WIPO application no. PCT/US2013/026409, filed Feb. 15, 2013, which are hereby incorporated by reference in their entireties.

FIELD OF TECHNOLOGY

The present disclosure relates generally to a rotary selector switch. The switch may be used in many industries and applications, including in the consumer electronics and automotive industries.

BACKGROUND

In the automotive context, selector switches are used in many applications. One such application relates to transmissions, where users select desired gears. Many types of transmissions use selector switches, including manual and automatic transmissions. Selector switches may include mechanically controlled connections to the transmission and/or electrically controlled connections (shift-by-wire).

Using certain current technologies, it may be possible for users to accidentally indicate a switching of gears when such a switch is not intended. For example, a user may be physically able to move a selector knob to indicate REVERSE while the user is moving forward in DRIVE. Because of certain electrical and software systems designed to correct for or prevent such an accidental shift, such an accidental use of a selector knob may cause a mismatch between the mechanical position of the selector knob, the electrical mode of the transmission, and the mechanical position of the transmission.

There exists a need for a rotary selector switch for use in systems, preventing undesired rotation.

SUMMARY

Exemplary rotary selector switches are disclosed herein. The examples are of switches in an automotive context relating to transmissions, but such exemplary descriptions are not intended to be limiting.

Other features and advantages of the present disclosure will become readily appreciated as the same becomes better understood after reading the following description when considered in conjunction with the accompanying drawings.

DETAILED DESCRIPTION

Referring to the following description and drawings, exemplary approaches to the disclosed systems are detailed. Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings.

Structure of Exemplary Embodiment

Figure 1:
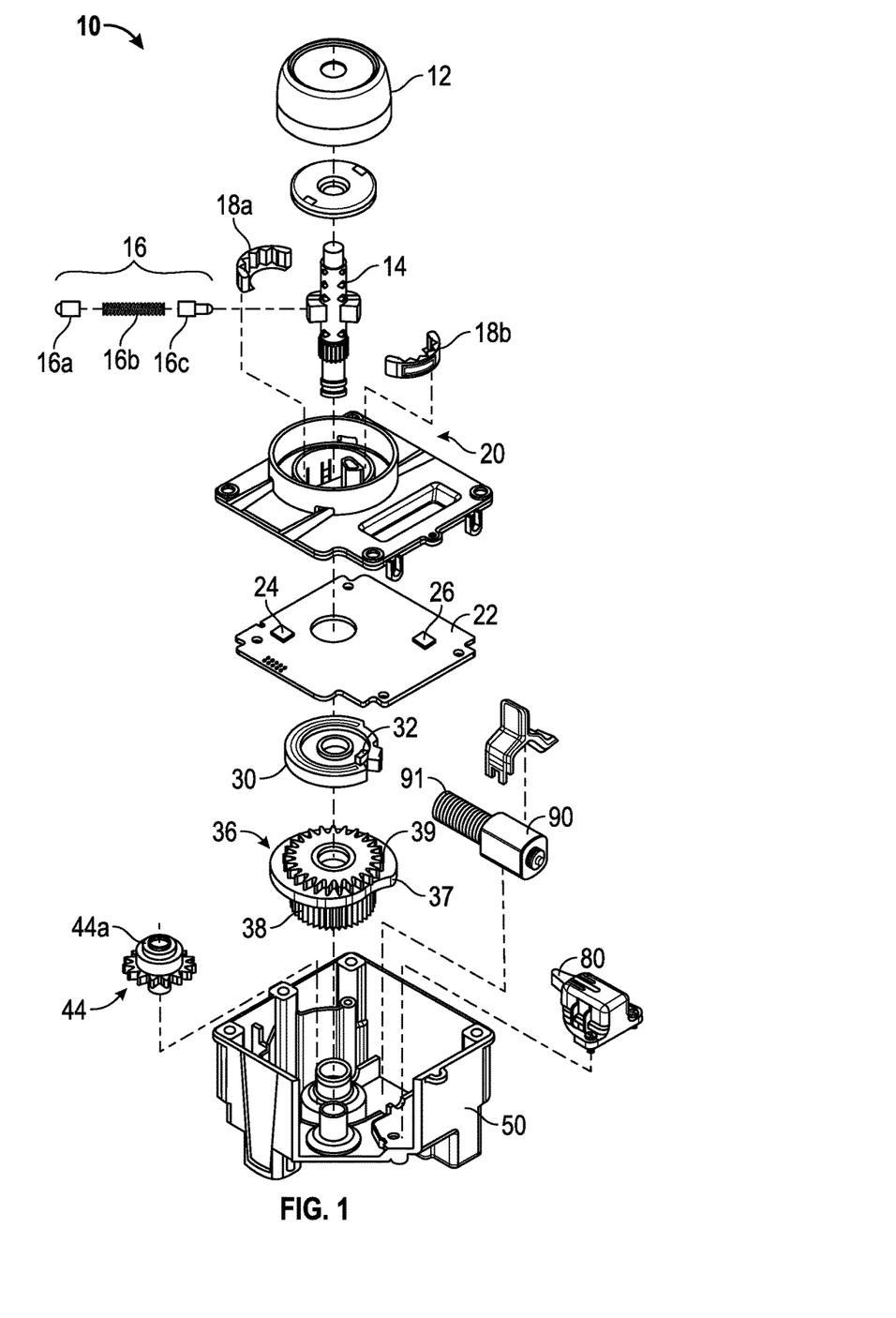
FIG. 1 is an exploded view of an exemplary rotary selector switch.
Figure 2:
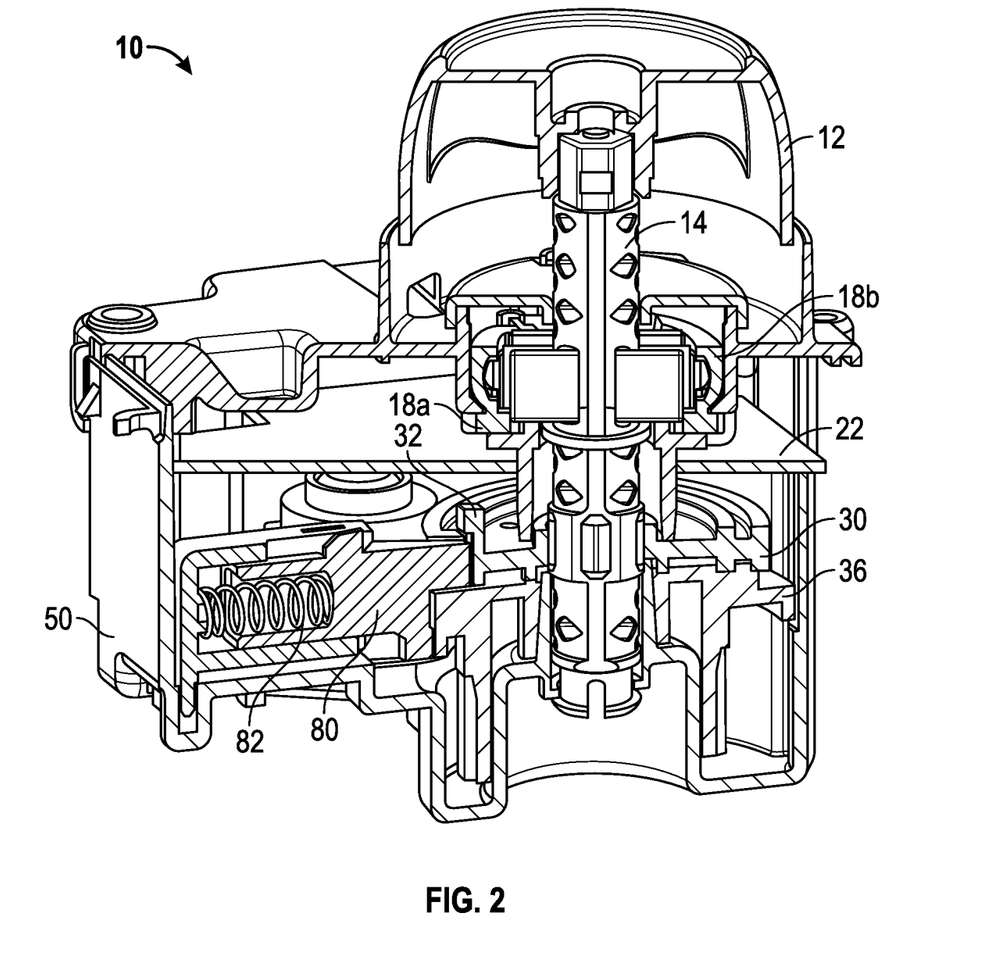
FIG. 2 is a cut-away side view of an exemplary rotary selector switch.
Figure 3:
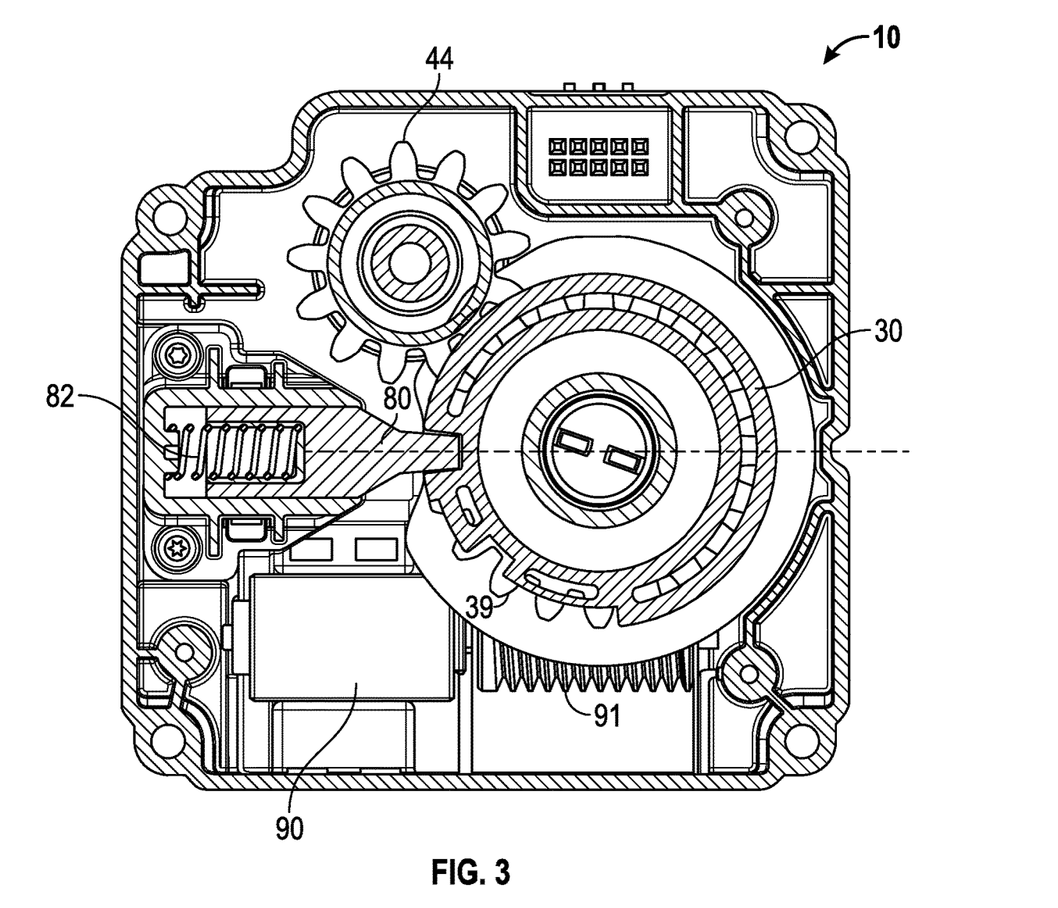
FIG. 3 is a cut-away top view of an exemplary rotary selector switch.

FIGS. 1, 2 and 3 depict a structure of an exemplary rotary selector switch 10. Referring to FIG. 1, an exploded view of exemplary rotary selector switch 10 is shown. An exemplary rotational selector knob 12 is shown. Knob 12 may be directly or indirectly rotated by a user to select a particular desired position. For example, a user may turn knob 12 to change from one automotive gear to another. Knob 12 can be formed in any number of shapes and made from any number of materials, including but not limited to one or more plastics. In the depicted embodiment, knob 12 is operably in communication with shaft 14 such that knob 12 rotates together with shaft 14. As drawn, knob 12 and shaft 14 are connected with each other in a fixed relationship.

Shaft 14 is rotatable in a controlled manner through its interactions with at least one bearing surface within the rotary selector switch 10. Such bearing surfaces may be integral with, added to or otherwise a part of a housing 50 or other structure within the rotary selector switch 10. Shaft 14 has an aperture through which detent plunger assembly 16 fits. The exemplary detent plunger assembly 16 includes detent plungers 16*a* and 16*b* with a resilient member 16*c* therebetween. Resilient member 16*c* may be, for example, a compression spring although other types of springs and structures with resilience properties are contemplated. Interfaces 18*a* and 18*b* are depicted as arcuate, although other shapes may be suitable. Interfaces 18*a* and 18*b* may be separate pieces or integrally formed with each other and/or with a rim or wall on platform 20, or other structures in or on housing 50. Interfaces 18*a* and 18*b* include inner surfaces shaped to interact with detent plungers 16*a* and 16*b* such that users can feel when knob 12 is in its intended position as distinguished from when knob 12 is moving or floating between positions. The shapes of the inner surfaces may be complementary or otherwise engageable with the shapes of terminal ends of the detent plungers 16*a* and 16*b*. Interfaces 18*a* and 18*b* are attachable via their outer surfaces to a platform 20 in instances when they not integrally formed with platform 20. As depicted, an outer surface of interface 18*a* and 18*b* is attachable to an inner surface of a rim on platform 20.

Figure 5:
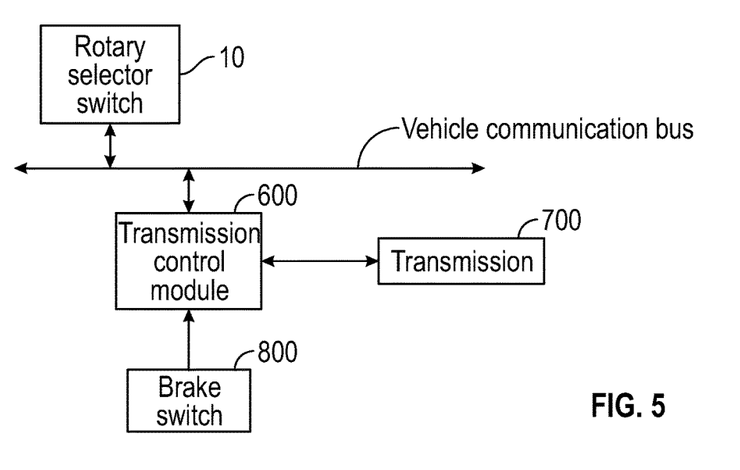
FIG. 5 is a flow chart schematically showing exemplary electrical communications.

In the depicted embodiment, a printed circuit board (PCB) 22 is attached to or affixed in a housing 50. The attachment or securement may be one or more of mechanical or chemical. The PCB 22 may have one or more sensors in electrical and/or mechanical communication therewith. FIG. 5 depicts an exemplary schematic for how electronics including PCB 22 of the rotary selector switch 10 are in electrical communication with other components of a vehicle. Generally, rotary selector switch 10 is in two-way electrical communication with a vehicle communication bus. The vehicle communication bus is in two-way electrical communication with a transmission control module 600, sometimes referred to as controller. The transmission control module 600 is in two-way electrical communication with the physical transmission 700 of a vehicle. The brake switch 800 is in electrical communication with the transmission control module, providing input regarding what gears may or may not be used under certain braking conditions.

The PCB may include a first sensor 24. In the depicted embodiment, sensor 24 is a hall or a magnetic sensor. It is contemplated that sensor 24 could also be an optical sensor or an array of optical sensors. In the depicted embodiment, sensor 24 interfaces with a magnet 44a on spur gear 44. If sensor 24 were optical, spur gear 44 would include a mechanism to interact with the optical sensor. In the depicted embodiment, sensor 24 and spur gear 44 are components of a feedback loop, and directly or indirectly provide instructions on when to stop moving a cam 36.

The PCB 22 may include a second sensor 26. The second sensor 26 in the depicted embodiment is a hall or magnetic sensor. It is contemplated that sensor 26 could also be an optical sensor or an array of optical sensors. In the depicted embodiment, sensor 26 interfaces with a magnet 32 on code disc 30. If sensor 26 were optical, code disc 30 would include a mechanism to interact with the optical sensor. In the depicted embodiment, sensor 26 measures rotational movement of code disc 30. Sensor 26 directly or indirectly provides input into a controller of a transmission regarding such rotational movement.

The PCB 22 may also include electronic mechanisms and communication systems adapted to read and/or process input from, at least, sensors 24 and 26, and send signals based upon at least that input. For example, the PCB 22 may send directly or indirectly, input from sensors 24 and 26 that are processed to result in a signal being sent to energize a motor 90. Such input may, at least in part, cause directly or indirectly the motor 90 to drive cam 36 and according a plunger 80 to different positions.

The shaft 14 also includes structure designed to interact with code disc 30 to cause a fixed rotation relationship between shaft 14 and code disc 30. In the depicted embodiment, code disc 30 is mechanically and operably connected with knob 12 and shaft 14 such they rotate together.

Code disc 30 rests on cam 36. At their interface, one or the other or both of code disc 30 or cam 36 may comprise a material in or its surface to enhance durability and/or reduce friction. Cam 36 has a mechanical gear interface 38 that interacts with a complementary gear profile 91 on motor 90. In the depicted embodiment, motor 90 has a gear profile 91 in the form of a helical worm. Other forms are contemplated so long as they may mechanically interact with gear interface 38. Motor 90 may be fixed or secured in or on housing 50 using any of a number of methods. Exemplary securement methods may include one or more of mechanical fasteners such as clips or chemical fasteners such as adhesives.

When a controller or other electronic mechanism sends a signal to energize the motor 90, the motor gear profile 91 drives the cam 36, thereby causing rotation. The cam 36 rotates on a bearing surface in housing 50 for controlled rotation. The rotation of cam 36 causes an upper gear profile 39 to drive the spur gear 44 to rotate at a predetermined gear ratio, which may be measured by sensor 24. The spur gear 44 rotates on a bearing surface in or on housing 50 that allows cam 36 to rotate in a controlled manner. In the depicted embodiment, the movement of cam 36 and spur gear 44 are a closed loop control system for motor 90.

When the motor 90 is energized, it rotates the cam 36, and with it the cam profile 37. The cam profile 37 runs along a thickness of the cam 36 at its circumference. The cam profile 37 is generally perpendicular or substantially perpendicular to a surface of the cam 36 that interacts with code disc 30. Depending on the position of the cam profile 37, plunger 80 moves laterally by sliding to the distance permitted by the cam profile 37. Plunger 80 may be spring-loaded or otherwise biased toward the cam profile 37. Spring 82 is depicted in FIG. 2 as an exemplary method of biasing. Plunger 80 may slide along a bearing surface on or in housing 50 for a controlled sliding action.

Figure 6:
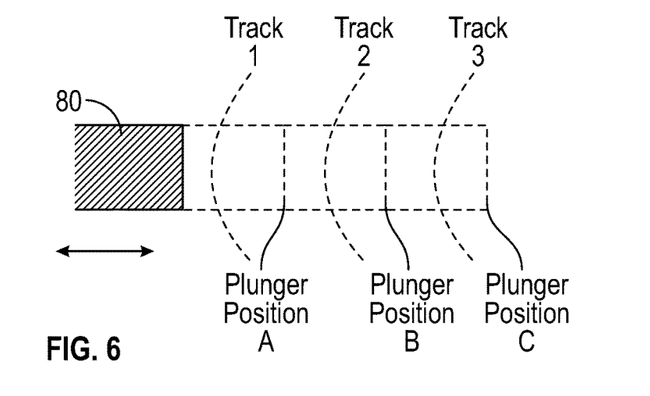
FIG. 6 depicts exemplary plunger positions for use in a rotary selector switch.

In the depicted embodiment, plunger 80 is shaped such that its lower portion interfaces with the cam profile 37 and its upper portion interfaces with the code disc 30. Cam profile 37 and code disc 30 combine to create tracks having blocks to stop plunger 80 from moving in a particular direction. In the depicted embodiment of FIG. 6, in track 1, cam profile 37 is in its least recessed position relative to a circumference of cam 36 that allows for any rotational blocking. In track 2, cam profile 37 is in its intermediate recessed position, and in track 3, cam profile 37 is in its most recessed position. That is, when plunger 80 moves to plunger position A, shapes on code disc 30 shown as protrusions in track 1 relative to recesses from a circumference of code disc 30, block plunger 80 from further rotational movement. A plunger 80 in plunger position B is blocked from movement by protrusions in track 2, and a plunger 80 in plunger position C is blocked from movement by protrusions in track 3.

Figure 7:
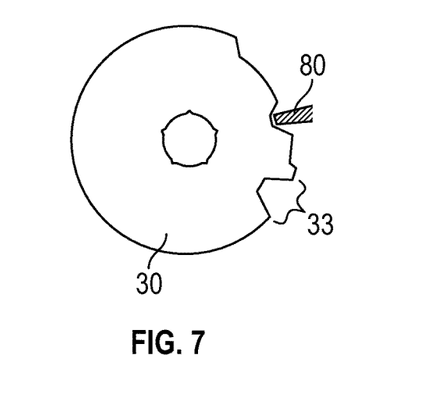
FIG. 7 is an exemplary code disc for use in a rotary selector switch.

Referring to FIG. 7, an exemplary code disc 30 has recesses relative to its circumference, and protrusions relative to its recesses. Plunger 80 is shown in a position that would be a lock. As used herein, "lock" refers to a state where a recess in the code disc 30 is complementary to an end of plunger 80 insertable therein, or is substantially so. That is, the end of the plunger inserted in the recess that is only slightly larger than the end of the plunger meaning the protrusions flanking the recess block movement of the plunger 80. A lock blocks movement in either clockwise or counterclockwise directions unless or until conditions change such as a user moving the rotary selector switch to change gears. Blocks, on the other hand, may or may not flank the end of the plunger 80 with closely fitted protrusions.

The depicted embodiment shows three tracks, but it is contemplated that more or fewer tracks could be used, depending upon, at least, the complexity of a particular transmission configuration. Additionally, the tracks are depicted in a horizontal arrangement. Other configurations are contemplated. For example, vertical configurations such as the ones described in FIGS. 1 and 2 of the provisional application to which this claims priority. FIGS. 1 and 2 of the provisional application No. 61/599,466 are incorporated herein by reference.

Figure 8A:
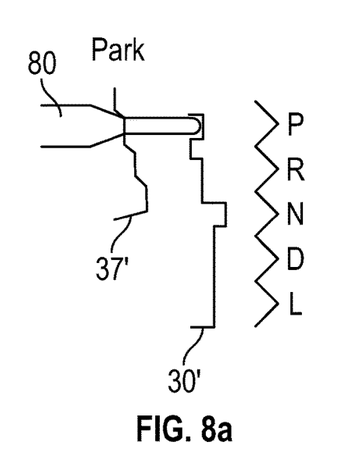
FIGS. 8*a*, 8*b*, 8*c* and 8*d* illustrate exemplary positions of a plunger, a cam and a code disc.

Referring to FIG. 8a in the PARK diagram, reference numeral 37' depicts a linearized cam profile 37 for ease of understanding. A portion of plunger 80 contacts 37' in track 1 and is locked into PARK through the corresponding recess flanked with protrusions in the linearized code disc 30'.

Figure 8B:
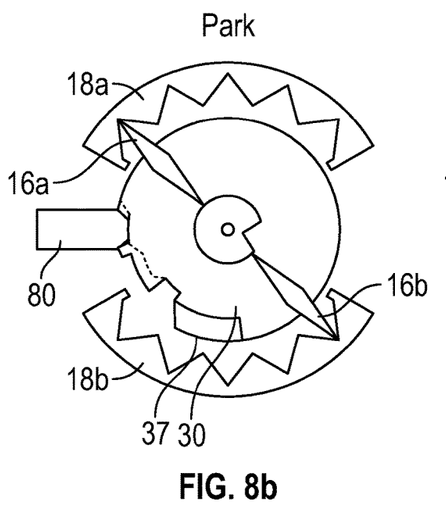
Figure 8C:
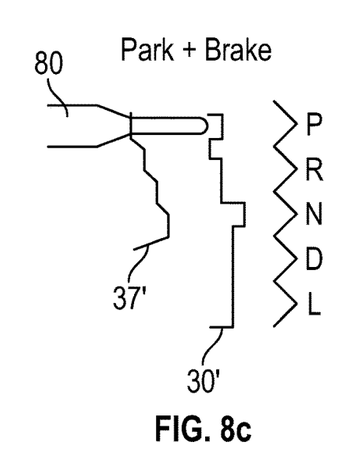

Referring to the PARK +BRAKE linearized diagram of FIG. 8c, the plunger 80 is not blocked at all; the plunger 80 is in a disengaged state. Understanding plunger 80 to be biased toward the linearized cam profile 37', as the plunger 80 is moved down, plunger 80 can be moved into a position where protrusions in track 2 could block movement, or into a position where protrusions in track 3 could block movement.

Figure 8D:
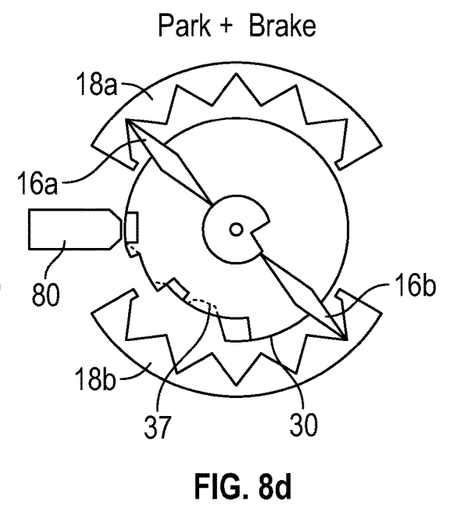

Referring to the circular diagrams, configurations are shown in the PARK (FIG. 8b) and PARK +BRAKE (FIG. 8d) position. Detent plungers 16a and 16b are engaged in PARK position in shapes in the inner surfaces of Interface 18a and 18b, respectively. Comparing the two circular diagrams, the difference is the clockwise motion of cam profile 37 when the brake is applied, causing the plunger 80 to be disengaged from blocks in any of the tracks.

Operation of Exemplary Embodiment

Under certain predetermined conditions, a block is desired to prevent accidental rotation. For example, if a vehicle is moving forward at 100 kh, a block may prevent a rotation to initiate a shift into REVERSE which may cause a mismatch. If a predetermined condition that calls for a block is met, a signal will be sent to the electronics on PCB 22, directly or indirectly. Then, a signal will be sent to energize the motor 90. The motor gear profile 91 will turn and cause rotation of cam 36. The rotation of cam 36 will drive the plunger 80 into the appropriate track, based upon the conditions. The code disc 30 will then cause a physical block preventing further rotation of knob 12. Feedback from the spur gear 44 and its associated sensor 24 on the PCB 22 creates a control loop causing, directly or indirectly, the motor 90 to discontinue driving the motor gear profile 91 when the plunger 80 is on the appropriate track. As depicted, this means when the plunger 80 has slid into the appropriate position.

Under certain predetermined conditions, a block should be removed. This happens, for example, when a brake is pressed. If a predetermined condition that calls for removal of a block is met, a signal will be sent to the electronics on or through PCB 22 to release the block. A signal will be sent to energize the motor 90 to rotate the cam 36 that will drive the plunger 80 to the appropriate track so that the plunger 80 does not prevent the knob 12 from rotating. Feedback from the spur gear 44 and its associated sensor 24 on the PCB 22 creates a control loop causing, directly or indirectly, the motor 90 to discontinue driving the motor gear profile 91 when the plunger has been moved into its appropriate position based upon the feedback.

Exemplary Conditions

Figure 4:
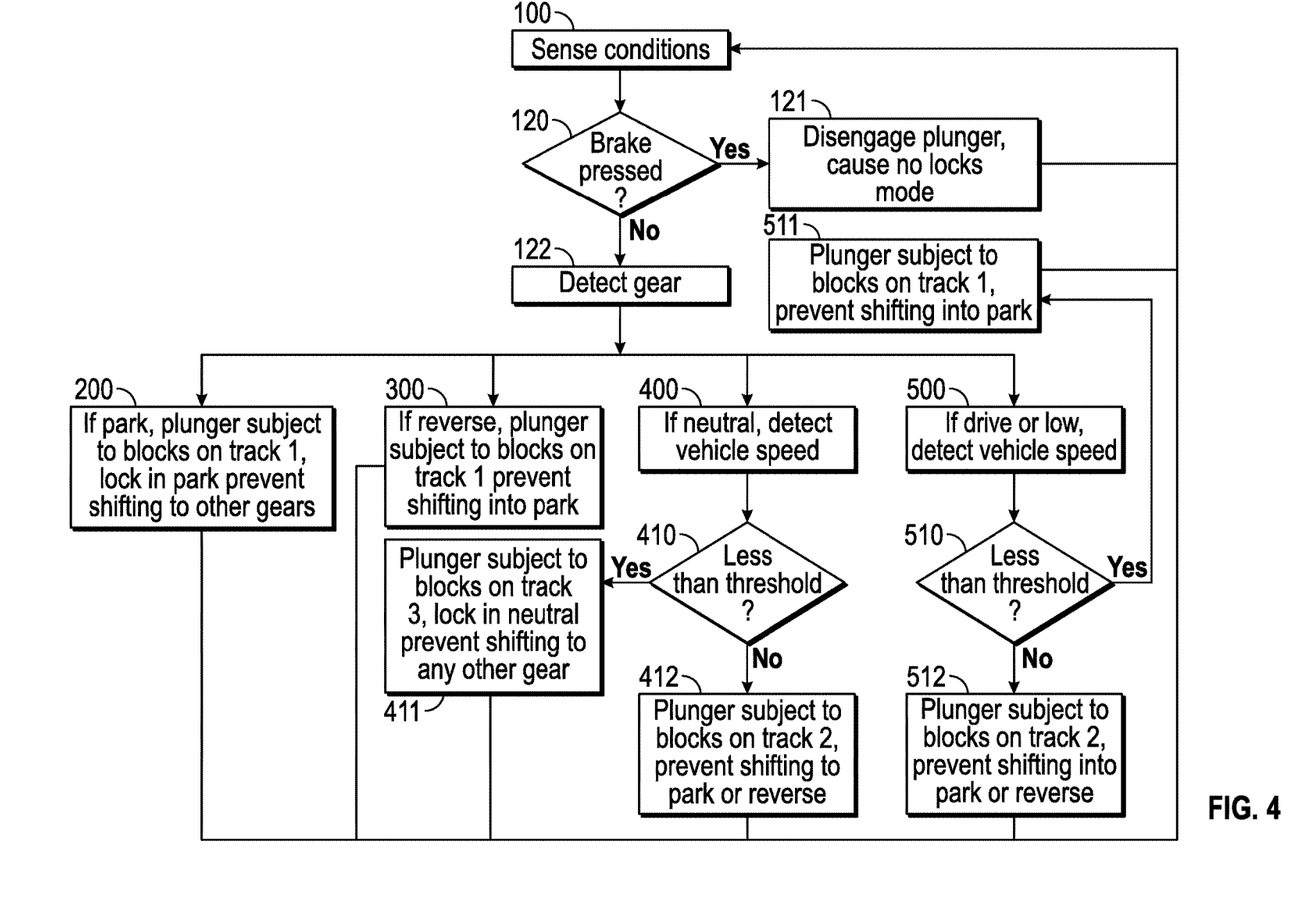
FIG. 4 is a flow chart showing the function of the exemplary rotary selector switch under particular predetermined conditions.

Referring to FIG. 4, an exemplary flow chart shows what type of conditions might be sensed by one or more sensors and processed by controller on or in electrical communication with the electronics on PCB 22 that relate the rotary selector switch 10. Block 100 depicts the state where sensors are sensing conditions, and such data is being processed and electronically communicated through the vehicle communication bus.

In block 120, it is determined whether a brake is pressed. If yes, and the plunger is not already disengaged, then as shown in block 121, the cam 36 is rotated by the motor 90 to a NO LOCKS state, and a plunger 80 to is moved a position that will not block otherwise permittable rotation allowable by the configuration. If the brake is not pressed, block 122 calls for a determination of what gear the transmission is in.

As indicated by block 200, if the transmission is in PARK and the plunger is not already in the appropriate position, the cam 36 is rotated by the motor 90, and plunger 80 is moved to depth where it is subject to blocks in track 1. Structure in code disc 30 locks the vehicle into PARK. In this condition, the rotary selector switch 10 prevents accidental shifting into any other gear. The geometry of the code disc 30 that receives the plunger 80 can be modified so that the act of shifting into another gear is not entirely prevented but rather made more physically difficult and can be performed with sufficient force. FIG. 7 provides an example of geometry designed to permit an override feature. For example, rather than purely complementary shape to a boxy plunger with a substantially square or rectangular profile as shown in FIG. 8, a recess on the code disc 30 can be shaped to have a substantially trapezoidal profile as it does in FIG. 7 (reference numeral 33) in the position akin to about 4:30 on an analog clock. With the interaction of these shapes, a user could overcome the resistance with physical force, which is less likely to be accidental. As used throughout this disclosure and in the claims, the expression "prevent" is inclusive of situations where the geometry makes an action it difficult but possible with sufficient force.

As indicated by block 300, if the transmission is in REVERSE and the plunger is not already in the appropriate position, the cam 36 is rotated by the motor 90 and plunger 80 is moved to a position where it is subject to track 1 blocks. In this condition, the rotary selector switch 10 prevents accidental shifting into PARK.

As indicated by block 400, if the transmission is in NEUTRAL, a further determination is made regarding whether the vehicle speed is above a certain threshold, as indicated in block 410. Thresholds can be set predetermined speeds such as, by way of non-limiting example, 5 kph. As stated in block 411, if the vehicle speed is below a certain threshold speed and the plunger 80 is not already in the appropriate position, the cam 36 is rotated by the motor 90 and the plunger 80 is moved into a position subject to track 3 blocks. The plunger 80 together with structure in code disc 30 lock the vehicle in neutral and prevent accidental shifting into any other gear. In this condition, the rotary selector switch 10 prevents accidental shifting into any other gear. As stated in block 412, if the vehicle speed is above a certain threshold speed, and the plunger 80 is not already in the appropriate position, the cam 36 is rotated by the motor 90 and the plunger is moved to a position where it is subject to track 2 blocks. In this condition, the rotary selector switch 10 prevents accidental shifting into PARK or REVERSE.

As indicated by block 500, if the transmission is in DRIVE or LOW gear, a further determination is made regarding whether the vehicle speed is above a certain threshold, as indicated in block 510. The threshold for this decision may be the same or different from the threshold selected for NEUTRAL analysis. As stated in block 511, if the vehicle speed is below a certain threshold speed and the plunger 80 is not already in the appropriate position, the cam 36 is rotated by the motor 90 and the plunger is moved into a position where it is subject to track 1 blocks. The plunger 80 together with structure in code disc 30 prevent accidental shifting into PARK. As stated in block 512, if the vehicle speed is above a certain threshold speed, and the plunger 80 is not already in the appropriate position, the cam 36 is rotated by the motor 90 and the plunger is moved into a position subject to track 2 blocks. In this condition, the rotary selector switch 10 prevents accidental shifting into PARK or REVERSE.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

What is claimed is:

1. A system for electrically shifting gears in an automobile, the system comprising:
    a rotary selector switch including
        a code disc having a plurality of recesses relative to a circumference of the code disc, the code disc being rotatable together with a knob and a shaft;
        a cam having a surface interfacing with a surface of the code disc, the cam having a circumference wherein at least a portion of the cam circumference is recessed to at least one depth; the cam having a cam profile along a thickness of the cam about the circumference of the cam; the cam being rotatable by a motor;
        a plunger biased toward the cam profile, the plunger having a first portion in contact with the cam profile and a second portion insertable into the recesses in the code disc;
        such that upon rotational movement of the knob, protrusions in the code disc relative to the recesses in the code disc are engageable with the second portion of the plunger, thereby preventing rotational movement of the rotary selector switch in a direction blocked by the protrusion, and
    the rotary switch in electrical communication with a transmission control module and a transmission.

2. The system of claim 1 wherein the rotary selector switch further includes an override feature, the override feature including the plurality of recesses in the code disc being shaped to have a substantially trapezoidal profile.

3. The system of claim 1 wherein the cam has a plurality of recesses, each recess having a depth that is the same or different from each other.

4. The system of claim 1 wherein protrusions in the code disc prevent rotational movement in both a clockwise and a counterclockwise direction.

5. The system of claim 1 wherein the rotary selector switch is immobile and cannot indicate a shift from reverse to park if a brake is not depressed.

6. The system of claim 1 wherein the rotary selector switch is immobile and cannot indicate a shift from park to any other gear if a brake is not depressed.

7. The system of claim 1 wherein the rotary selector switch is immobile and cannot indicate a shift from neutral to any other gear if a brake is not depressed and if a vehicle speed is less than a predetermined threshold.

8. The system of claim 1 wherein the rotary selector switch is immobile and cannot indicate a shift from neutral to reverse or park if a brake is not depressed and if a vehicle speed is greater than a predetermined threshold.

9. The system of claim 1 wherein the rotary selector switch is immobile and cannot indicate a shift from drive to park if a brake is not depressed and if a vehicle speed is less than a predetermined threshold.

10. The system of claim 1 wherein the rotary selector switch is immobile and cannot indicate a shift from drive to park or reverse if a brake is not depressed and if a vehicle speed is greater than a predetermined threshold.

* * * * *